United States Patent
Brusarosco et al.

(10) Patent No.: US 9,096,103 B2
(45) Date of Patent: Aug. 4, 2015

(54) MONITORING DEVICE FOR TYRES FOR VEHICLE WHEELS, TYRE FOR VEHICLE WHEELS PROVIDED WITH SAID MONITORING DEVICE, AND METHOD FOR INSTALLING AN ELECTRONIC UNIT IN SAID TYRE

(71) Applicant: PIRELLI TYRE S.P.A., Milan (IT)

(72) Inventors: Massimo Brusarosco, Milan (IT); Federico Mancosu, Milan (IT); Fabio Covolo, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 0 days.

(21) Appl. No.: 14/365,365

(22) PCT Filed: Dec. 18, 2012

(86) PCT No.: PCT/IB2012/057411
§ 371 (c)(1),
(2) Date: Jun. 13, 2014

(87) PCT Pub. No.: WO2013/098712
PCT Pub. Date: Jul. 4, 2013

(65) Prior Publication Data
US 2014/0352420 A1 Dec. 4, 2014

Related U.S. Application Data

(60) Provisional application No. 61/594,071, filed on Feb. 2, 2012.

(30) Foreign Application Priority Data

Dec. 29, 2011 (IT) ............................. MI2011A2427

(51) Int. Cl.
*G01M 17/02* (2006.01)
*B60C 23/02* (2006.01)
(Continued)

(52) U.S. Cl.
CPC ......... *B60C 23/0408* (2013.01); *B60C 23/0493* (2013.01); *B29D 2030/0077* (2013.01); *Y10T 29/49492* (2015.01)

(58) Field of Classification Search
None
See application file for complete search history.

(56) References Cited

U.S. PATENT DOCUMENTS

| 6,030,478 | A | 2/2000 | Koch et al. |
| 6,386,251 | B1 | 5/2002 | Koch et al. |

(Continued)

FOREIGN PATENT DOCUMENTS

| DE | 10 2007 030 238 | 1/2009 |
| DE | 10 2009 006 707 | 8/2010 |

(Continued)

OTHER PUBLICATIONS

International Search Report from the European Patent Office for International Application No. PCT/IB2012/057411, mailing date Mar. 13, 2013.

(Continued)

*Primary Examiner* — Andre Allen
(74) *Attorney, Agent, or Firm* — Finnegan, Henderson, Farabow, Garrett & Dunner, L.L.P.

(57) ABSTRACT

A monitoring device for tires for vehicle wheels includes: an electronic unit; a connecting member configured for constraining the electronic unit to a tire, the connecting member including: a first and a second base portion, mutually separated by a separated region, each of the base portions having a respective base surface associable with an inner surface of a tire; a housing portion associated with the base portions defining, in cooperation with said base portions, a cavity for housing the electronic unit, wherein the housing portion includes at least one side structure, configured for exerting a containing action at least relative to movements of the electronic unit carried out in a major extension direction of the separation region and with respect to movements of said electronic unit carried out in a direction orthogonal to the major extension direction of the separation region wherein the cavity is confined at least by a side surface defined by an inner surface of the side structure, wherein the electronic unit includes at least one sensor, at least one antenna and a holding body for housing at least the sensor and the antenna, wherein the holding body has at least one side surface, wherein, when the electronic unit is inserted in the cavity: the side surface of the holding body faces the side surface of the cavity, and the sizes of said cavity and of the holding body are such as to form at least one first gap at least partly separating the side surface of the holding body and the side surface of the cavity.

28 Claims, 8 Drawing Sheets

(51) Int. Cl.
    *B60C 23/04* (2006.01)
    *B29D 30/00* (2006.01)

(56) References Cited

U.S. PATENT DOCUMENTS

| | | | |
|---|---|---|---|
| 6,860,303 | B2 | 3/2005 | Rensel et al. |
| 6,885,291 | B1 * | 4/2005 | Pollack et al. ............... 340/445 |
| 7,009,506 | B2 | 3/2006 | Wilson et al. |
| 7,874,205 | B2 | 1/2011 | Hironaka |
| 7,908,918 | B2 | 3/2011 | Brusarosco et al. |
| 2006/0032564 | A1 | 2/2006 | Weaver |
| 2008/0060761 | A1 | 3/2008 | Weaver |
| 2009/0101257 | A1 | 4/2009 | Brusarosco et al. |
| 2009/0115591 | A1 * | 5/2009 | Mancosu et al. ............. 340/447 |
| 2009/0183562 | A1 * | 7/2009 | Brusarosco et al. ......... 73/146.5 |
| 2009/0266153 | A1 | 10/2009 | Hironaka |
| 2009/0320580 | A1 * | 12/2009 | Mancosu et al. ................ 73/146 |
| 2011/0240195 | A1 | 10/2011 | Ellmann |

FOREIGN PATENT DOCUMENTS

| | | |
|---|---|---|
| DE | 10 2009 025 794 | 11/2010 |
| EP | 1 627 753 | 2/2006 |
| EP | 1 948 452 | 1/2009 |
| IT | MI 2001 A 002426 | 12/2011 |
| IT | MI 2001 A 002427 | 12/2011 |
| JP | 2007-099052 | 4/2007 |
| JP | 2007-331293 | 12/2007 |
| WO | WO 2006/126215 | 11/2006 |
| WO | WO 2007/048621 | 5/2007 |
| WO | WO 2007/049093 | 5/2007 |
| WO | WO 2007/121768 | 11/2007 |
| WO | WO 2010/043264 | 4/2010 |
| WO | WO 2013/098711 | 7/2013 |
| WO | WO 2013/111073 | 8/2013 |

OTHER PUBLICATIONS

Written Opinion of the International Searching Authority from the European Patent Office for International Application PCT/IB2012/057411, mailing date Mar. 13, 2013.

* cited by examiner

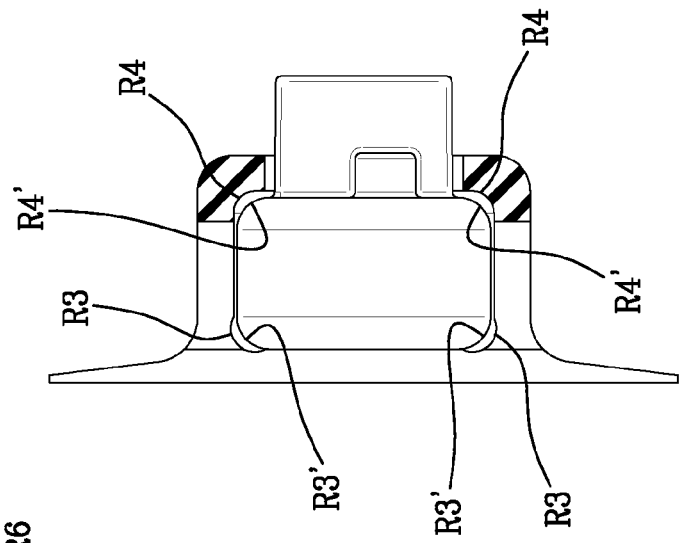
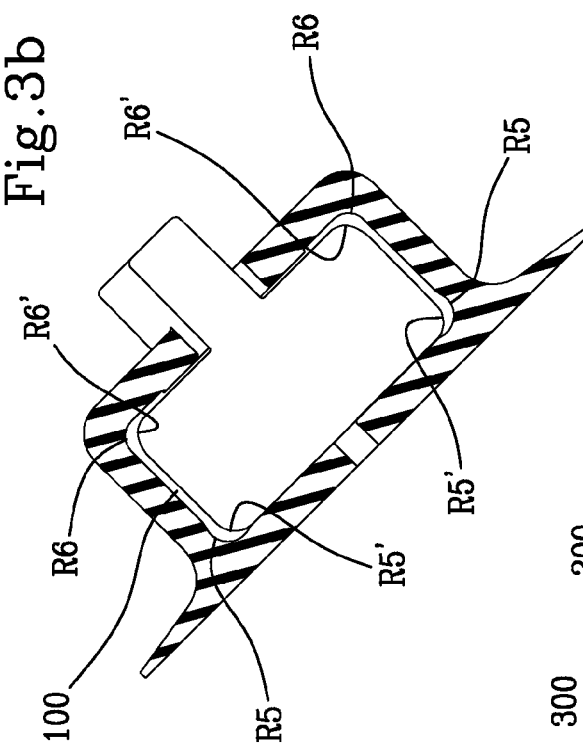
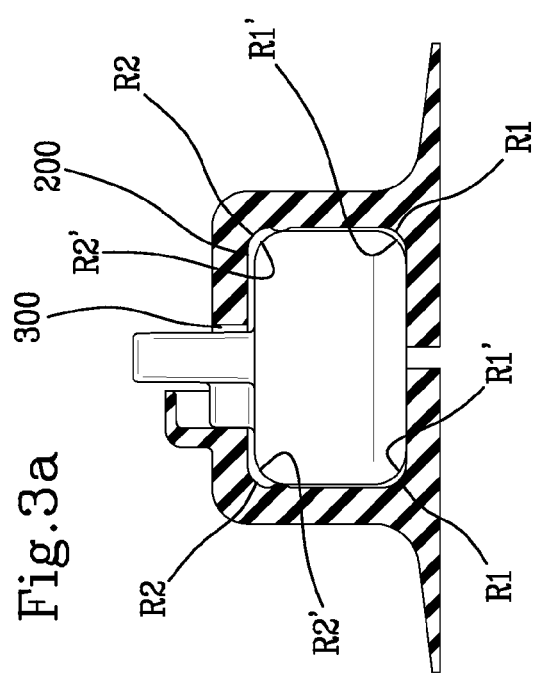

MONITORING DEVICE FOR TYRES FOR VEHICLE WHEELS, TYRE FOR VEHICLE WHEELS PROVIDED WITH SAID MONITORING DEVICE, AND METHOD FOR INSTALLING AN ELECTRONIC UNIT IN SAID TYRE

CROSS REFERENCE TO RELATED APPLICATIONS

This application is a national phase application based on PCT/IB2012/057411, filed Dec. 18, 2012, which claims the priority of Italian Application No. MI2011A002427, filed Dec. 29, 2011, and the benefit of U.S. Provisional Application No. 61/594,071, filed Feb. 2, 2012, the content of each application being incorporated herein by reference.

BACKGROUND OF THE INVENTION

1. Field of the Invention

The present invention regards a monitoring device for tyres for vehicle wheels.

The present invention also regards a tyre for vehicle wheels provided with said monitoring device.

The present invention also regards a method for installing an electronic unit in a tyre.

2. Description of the Related Art

The need to monitor, in real time, the operating conditions of tyres, and possibly keep track of the time evolution of parameters representative of such operation, has assumed increasing importance by virtue of the requirement of increased safety imposed on vehicles by clients and/or by national directives/legislation.

The parameters generally considered and/or kept under control can be, for example, temperature, pressure, distance travelled by the tyre (and/or number of revolutions), load acting on the tyre, as well as parameters which derive on mathematical processing that can be executed on the basis of signals detected by sensors placed inside the tyres.

The parameters can also be used for identifying particular conditions in which the tyre and/or the vehicle are found, such as wear conditions, aquaplane conditions etc. and, more generally, for the monitoring of the stresses acting on the tyre during its rolling (e.g. on the road surface).

The data detected or calculated can also be employed for the optimization of the set-up of passive control systems of the vehicle, e.g. systems adapted to verify the suitability between the type of tyre actually installed and the types of tyre provided and considered acceptable, as well as active control systems, which use, among other parameters, those identifying the type of tyre for actively operating on the operation of the vehicle, in order to maintain the latter in safety conditions (e.g. ABS, ESP, etc.).

For such purpose, inside the tyre an electronic unit can be mounted, comprising at least one sensor.

The electronic unit can be mounted on the inner surface of the tyre by means of a connecting member, obtained for example in elastomeric material.

Documents U.S. Pat. No. 6,030,478, U.S. Pat. No. 6,386,251, U.S. Pat. No. 6,860,303, U.S. Pat. No. 7,009,506, EP 1948452, U.S. Pat. No. 7,908,918 and U.S. Pat. No. 7,874,205 show several techniques by means of which an electronic unit can be associated with the inner surface of the tyre.

SUMMARY OF THE INVENTION

The Applicant has observed that, in the systems of known type, the electronic unit is firmly fixed to the connecting member on which it is mounted, by means of retaining means such as threads, pins, caps, circling rings and/or by means of close contact between the outer surface of the holding body in which the circuitry is housed that is part of the electronic unit itself and one or more surfaces of the connecting member.

The Applicant has however found that due to the strong stresses to which the tyre is subjected during use, as well as to the coupling between an element brought to bend during rolling (the tyre) and a rigid element (the electronic unit), a connection of this kind can cause a concentration of stresses and/or deformations, and consequently a fatigue and/or progressive wear of the connecting member, in particular when the latter is associated with the inner surface of the tyre at a crown portion thereof (e.g. at the equatorial plane of the tyre).

The Applicant therefore observed that the concentration of stresses caused by the mechanical interference between the electronic unit and the walls of the cavity in which said electronic unit is housed can lead to a early breakage of the connecting member, and to a situation in which the electronic unit is no longer constrained to the inner surface of the tyre, but is moved without any control inside the same, with clear negative consequences both regarding the operation and the integrity of the electronic unit itself.

The Applicant perceived that controlling the mechanical interaction between the electronic unit and the connecting member, would have allowed to quite considerably reduce the concentration of the stresses on the connecting member, thus ensuring a reliable and enduring bond between the electronic unit and the tyre.

After lengthy experimentation, the Applicant found that leaving one or more gaps between the outer surface of the holding body of the electronic unit and the surface confining a cavity predisposed in the connecting member and adapted to house the electronic unit, would have allowed to significantly improve the reliability and durability of the bond between the electronic unit and the tyre by means of the connecting member.

Without being confined to any interpretive theory, the Applicant deems that such result can depend on the fact that the gap or the gaps between the surface of the cavity in which the electronic unit is housed and the surface of the electronic unit itself allows/allow the connecting member to be gradually shaped to the surface of the electronic unit in case of impact/interaction between the two surfaces, facilitating a particularly effective dissipation of the energy transmitted from the electronic unit to the connecting member even in case of strong deformations acting on the tyre; this limits the concentration of the stresses acting on the connecting member and the relative deformations and thus carries out a substantial damping and distribution action on a greater surface area of the impact itself.

According to a first aspect, the invention regards a monitoring device for tyres for vehicle wheels, comprising:
  an electronic unit;
  a connecting member configured for constraining said electronic unit to a tyre, said connecting member comprising:
    a first and a second base portion, mutually separated by a separation region, each of said base portions having a respective base surface associable with an inner surface of a tyre;
    a housing portion associated with said base portions defining, in cooperation with said base portions, a cavity for housing said electronic unit,
  wherein said housing portion comprises at least one side structure, configured for exerting a containing action at least relative to movements of said electronic unit carried out in a major extension direction of said separation region and with respect to movements of said electronic unit carried out in a direction orthogonal to the major extension direction of said separation region, wherein said cavity is confined at least by a side surface defined by an inner surface of said side structure, wherein said electronic unit comprises at least one sensor, at least one antenna and a holding body for housing at least said sensor and said antenna, wherein said holding body has at least one side surface, wherein, when said electronic unit is inserted in said cavity:
- the side surface of the holding body faces the side surface of the cavity,
- the sizes of said cavity and said holding body are such as to form at least one first gap at least partly separating the side surface of the holding body and the side surface of the cavity.

The Applicant found that, in this manner, the mechanical interactions between the electronic unit and the connecting member can be controlled, in a manner so as to confer reliability and durability to the bond between the electronic unit itself and the tyre by means of the connecting member.

According to another aspect, the invention regards a tyre for vehicle wheels, comprising an inner surface having substantially toroidal conformation, on which said monitoring device is mounted.

According to a further aspect, the invention regards a method for installing an electronic unit in a tyre, comprising:
- providing said electronic unit and said connecting member, so as to form said monitoring device;
- fastening the base surfaces of the base portions of said connecting member to an inner surface of a tyre.

In accordance with one or more of the abovementioned aspects, the invention can comprise one or more preferred characteristics indicated hereinbelow.

Preferably, said cavity is confined on the lower part thereof by a lower surface defined by top surfaces of said base portions.

Preferably said cavity is confined on the upper part thereof by a top surface defined by a lower surface of a top wall of said housing portion.

Preferably said electronic unit can be positioned inside said cavity at least at one position in which said first gap is peripherally continuous around said holding body in at least one plane substantially parallel to a plane defined by said base surfaces.

In this manner it is possible to control the interactions between the outer surface of the holding body and the surfaces confining the cavity.

Preferably, the first gap can have a width included between about 0.1 mm and about 1 mm. Such width can for example be calculated on lines lying in a plane substantially parallel to the plane defined by said base surfaces, and passing through a geometric centre of a profile defined by the base portions in the plane of the base surfaces.

Preferably said side structure comprises one or more expansions extending from the side surface of said cavity to the inside of said cavity.

Such expansions allow further controlling the interactions between the outer surface of the holding body and the surfaces confining the cavity, also in tyre operating conditions.

Preferably said side structure comprises at least two of said expansions positioned on mutually opposite sides relative to a plane substantially orthogonal to the plane defined by said base surfaces and passing through a major extension direction of said separation region.

Preferably said holding body comprises a respective lower surface.

Preferably when said electronic unit is found in said specific position, the lower surface of said holding body is in contact with the lower surface of said cavity.

Preferably said holding body comprises a respective top surface.

Preferably said electronic unit can be positioned inside said cavity at least at one position in which the top surface of said holding body and the top surface of said cavity are separated by a second gap.

In this manner, the mechanical interactions between the holding body and the top wall of the housing portion of the connecting member are controlled.

Preferably said second gap is such that, when the lower surface of said holding body is in contact with the lower surface of said cavity, the top surface of said holding body is fully separated from the top surface of said cavity.

Preferably, the second gap can have a width included between about 0.1 mm and about 1 mm. Such width can be for example calculated on a line orthogonal to the plane of the base surfaces and belonging to the plane perpendicular to the major extension direction of the separation region.

Preferably said holding body has at least one first expansion inside which said antenna extends at least partly.

Preferably said holding body has a second expansion inside which said sensor extends at least partly. In case of pressure sensor and/or temperature sensor, the second expansion has an opening, for the purpose of allowing the sensor to carry out the necessary measurements.

Preferably the top wall of said housing portion is associated with said base portions in such a manner that said side structure is interposed between said base portions and said top wall.

Preferably said top wall has at least one through window through which said first expansion and/or said second expansion extend at least partly.

Preferably said electronic unit can be positioned inside said cavity in at least one position in which said first expansion and/or said second expansion are fully separated from a perimetral profile of said through window.

Preferably the connecting member has a third gap separating said first expansion and/or said second expansion of the holding body from the perimetral profile of said through window when said electronic unit is positioned inside the cavity.

In this manner, possible mechanical actions deriving from the stresses caused by the tyre during operation are prevented from being concentrated in the region of contact between the expansions of the holding body and the profile of the through window obtained in said top wall, thus preventing the breakage of said top wall.

As an example, the third gap can have a width included between about 0.1 mm and about 1 mm. Such width can for example be calculated on a line belonging to the plane passing through the major extension direction of the separation region and orthogonal to the plane of the base surfaces.

Preferably, in a section taken along a first plane orthogonal to the major extension direction of said separation region:
- a connection region between the side surface and the lower surface confining said cavity, has a curvilinear profile different from a curvilinear profile defined at a connection region between the side surface and the lower surface of said holding body.

Preferably, in a section taken along a first plane orthogonal to the major extension direction of said separation region:

a connection region between the side surface and the top surface confining said cavity has a curvilinear profile different from a curvilinear profile defined at a connection region between the side surface and a top surface of said holding body.

Preferably, in a section taken along a second plane orthogonal to the plane defined by said base surfaces and parallel to the major extension direction of the separation region:

a connection region between the side surface and the lower surface confining said cavity has a curvilinear profile different from a curvilinear profile defined at a connection region between the side surface and a lower surface of said holding body.

Preferably, in a section taken along a second plane orthogonal to the plane defined by said base surfaces and parallel to the major extension direction of said separation region:

a connection region between the side surface and the top surface confining said cavity has a curvilinear profile different from a curvilinear profile defined at a connection region between the side surface and a top surface of said holding body.

Preferably, in a section taken along a third plane passing through an axis orthogonal to the plane defined by said base surfaces and passing through the centre of a profile defined by said base portions in the plane identified by said base surfaces:

a connection region between the side surface and the lower surface confining said cavity has a curvilinear profile different from a curvilinear profile defined at a connection region between the side surface and a lower surface of said holding body.

Preferably, in a section taken along a third plane passing through an axis orthogonal to the plane defined by said base surfaces and passing through the centre of a profile defined by said base portions in the plane identified by said base surfaces:

a connection region between the side surface and the top surface of said cavity has a curvilinear profile different from a curvilinear profile defined at a connection region between the side surface and a top surface of said holding body.

Preferably, in a section taken along a fourth plane substantially parallel to the plane defined by said base surfaces:

said holding body has a perimetral profile comprising two substantially rectilinear opposite segments connected by a pair of curvilinear connections having a profile different from the curvilinear profile shown by the perimetral profile portion of said housing portion facing said curvilinear connections.

In this manner, when each of said profiles comes into contact with the respective profile facing thereto, the stresses are better distributed on the respective surfaces, optimizing the absorption of the stresses to which the monitoring device is subjected during the rolling of the tyre.

Preferably said holding body of said electronic unit does not show cylindrical symmetry relative to any axis.

Preferably said inner surface of said housing portion confining said cavity does not show cylindrical symmetry relative to any axis.

Preferably the major extension direction of said separation region between the base portions of said connecting member is disposed substantially in a radial plane of said tyre.

Preferably said inner surface of said tyre is a liner of said tyre.

BRIEF DESCRIPTION OF THE DRAWINGS

Further characteristics and advantages will be clearer from the description of a preferred and non-exclusive embodiment of the invention.

Such description is provided hereinbelow with reference to the attached figures, also being provided purely by way of non-limiting example, wherein:

FIGS. 3a-3c respectively show sectional views of the device of FIG. 2 taken along the lines P1-P1, P2-P2, P3-P3 shown in FIG. 3, with the electronic unit in side view in FIGS. 3a and 3c;

FIG. 6a schematically shows a sectional view of the device of FIG. 6 taken along the line P4-P4 shown in FIG. 6;

DETAILED DESCRIPTION OF THE INVENTION

With reference to the attached figures, a tyre for vehicle wheels provided with a monitoring device according to the present invention is indicated in its entirety with 1. The monitoring device is indicated with the reference number 10.

The tyre 1, per se known, is not described herein in detail.

Figure 1:
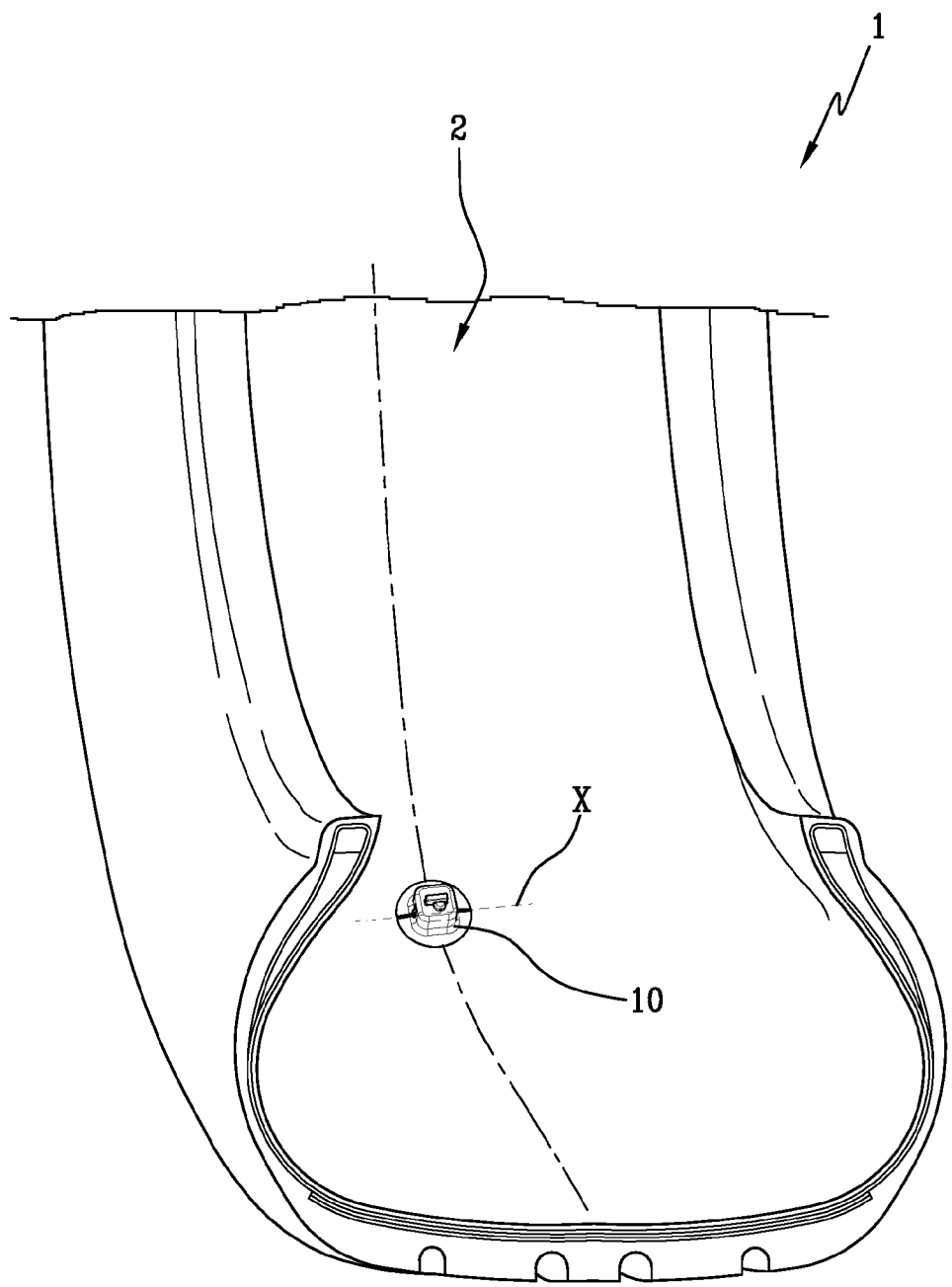
FIG. 1 shows a tyre for vehicle wheels on which a monitoring device according to the invention is installed.

The tyre 1 (FIG. 1) comprises an inner surface 2, preferably comprising or constituted by the so-called "liner".

The monitoring device 10 is mounted on such inner surface 2.

Figure 4:
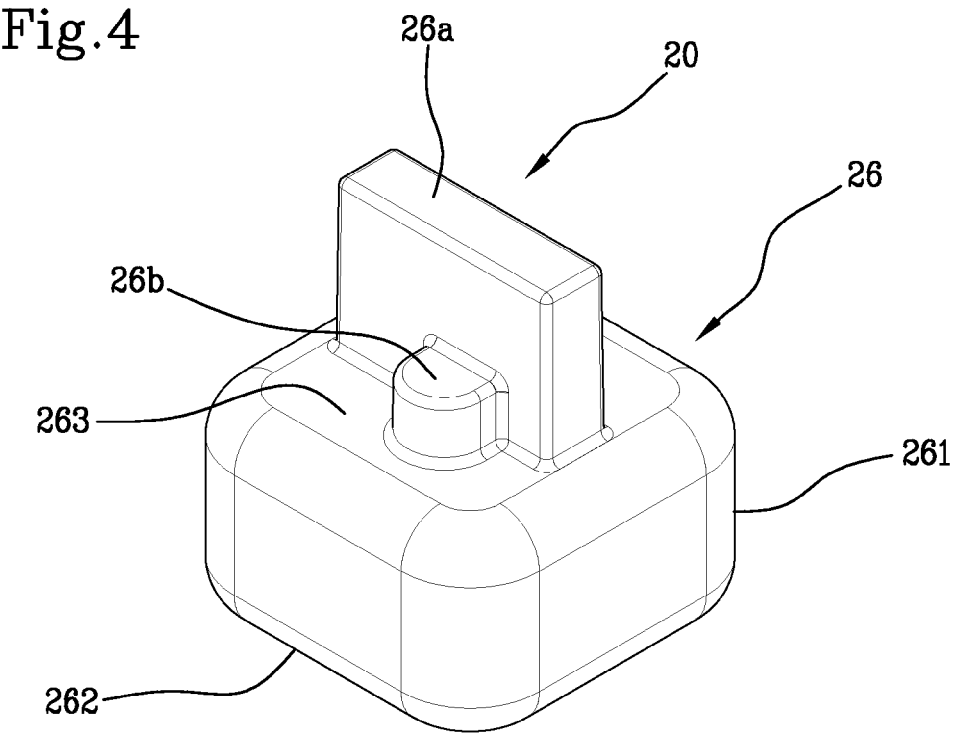
FIG. 4 schematically shows a perspective view of an embodiment of an electronic unit usable in a monitoring device according to the invention.
Figure 5:
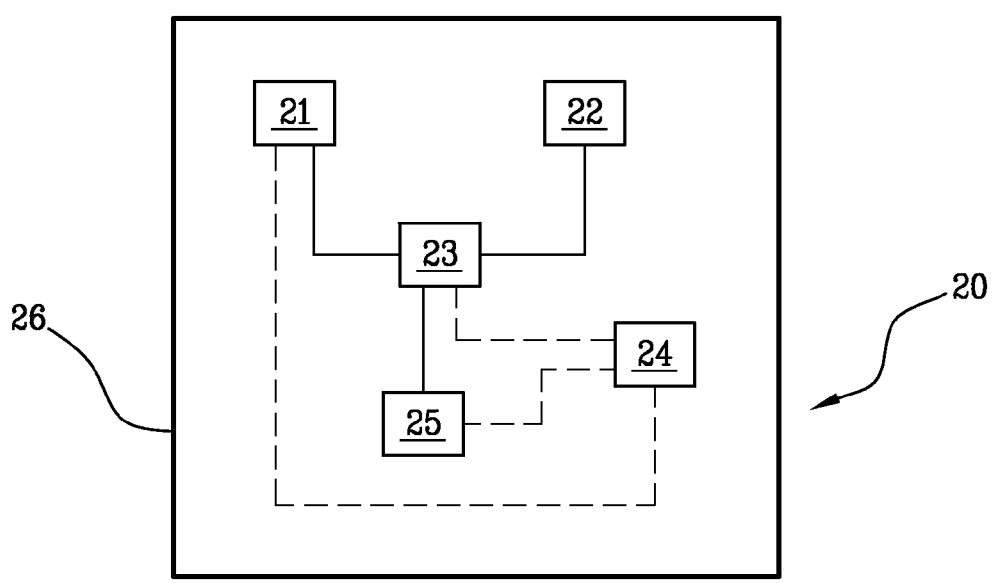
FIG. 5 shows a block diagram of an embodiment of an electronic unit usable in a monitoring device according to the invention.
Figure 6:
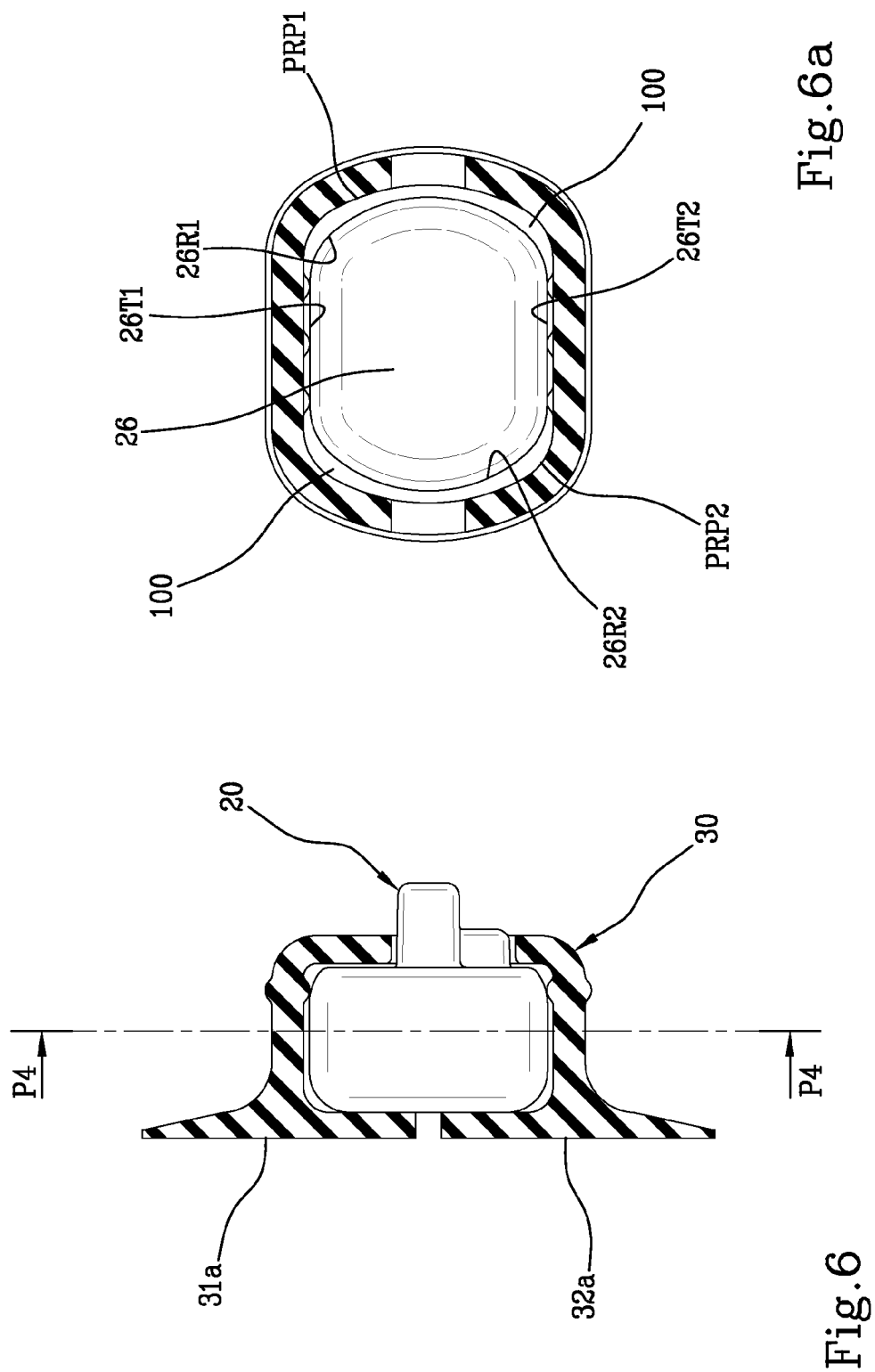
FIG. 6 schematically shows a sectional view of a second embodiment of a monitoring device according to the invention.

The monitoring device 10 comprises an electronic unit 20 (FIGS. 4-5).

Preferably the electronic unit 20 comprises at least one sensor 21 and at least one antenna 22.

For example, said sensor 21 is a pressure and/or temperature sensor, configured for detecting a pressure and/or a temperature inside the tyre 1.

In a further embodiment, the sensor 21 can be a sensor of accelerometer type, configured for detecting mechanical stresses to which the tyre 1 is subjected.

In addition or as an alternative, the sensor 21 can be a sensor of the inertial type.

In one embodiment, the sensor 21 can be constituted at least in part by a self-powering ("energy scavenger") system of the electronic unit, from which it is possible to obtain both the electrical power supply for the electronic unit itself, and signals, e.g. analogue signals, representative of the mechanical actions transmitted by the tyre.

In general, the sensor 21 can also be employed for determining the number of revolutions of the tyre and/or the load acting on the tyre and/or the angular speed and/or parameters representative of operating conditions of the tyre (e.g. friction, wear and/or aquaplane conditions).

The antenna 22 has at least the task of transmitting the data detected by the sensor 21 to the apparatuses on board the vehicle on which the tyre 1 is mounted.

Preferably the electronic unit 20 also comprises a processing circuit 23, associated with the sensor 21 and with the antenna 22.

The processing circuit 23 can have the task of managing (for example acquiring, and/or filtering, and/or processing) the signals detected by the sensor 21, for the purpose of obtaining the data to be stored and/or transmitted by means of the antenna 22.

Preferably the electronic unit 20 also comprises a power supply system 24, predisposed to supply electrical power to the electronic unit 20.

Preferably the power supply system 24 comprises at least one battery. In addition or as an alternative to such battery, the power supply system 24 can comprise a device capable of transforming the mechanical energy transmitted to the device itself during the rolling of the tyre into electrical energy (energy scavenger).

The antenna 22 can also receive signals from the apparatuses on board the vehicle and/or from systems placed outside the vehicle itself. For example, the electronic unit 20 can comprise two antennas, of which one is predisposed to transmit (e.g. at a frequency of 433 MHz) the processed and/or stored data, and another predisposed to receive (e.g. at a frequency of 125 kHz) signals from systems placed on board the vehicle and/or outside the vehicle itself (e.g. wake-up signals for the monitoring device, and/or signals containing pre-configuration data for the monitoring device, and/or signals containing programming instructions for the monitoring device).

The electronic unit 20 can also comprise a memory 25, in which data relative to the operation of the tyre and/or configuration/setup data typically referred to the characteristics the tyre itself, and/or identification data of the monitoring device 10 and/or of the tyre 1 is stored. By way of example, in the memory 25 there can be stored data representative of the distance travelled by the tyre, preferably determined as a function of the overall number of revolutions carried out by the tyre itself. In the memory 25, it is also possible to store one or more procedures for processing the signal detected by the at least one sensor 21, and/or algorithms for calculating predetermined parameters starting from signals detected by the at least one sensor 21 (or on pre-processed signals), and/or signal filtering logic.

Preferably the electronic unit 20 comprises a holding body 26, preferably rigid, in which the different elements (sensor, antenna, power supply system etc.) are housed.

The holding body 26 can be obtained according to techniques that are very well known, for example embedding the circuitry of the electronic unit 20 in a resin casting which stiffens following the solidification thereof, or by means of moulding.

Preferably, the electronic unit 20, and in particular the holding body 26, do not reveal cylindrical symmetry around any axis.

Preferably the holding body 26 has at least one first expansion 26a inside which the antenna (or at least one of the antennas) 22 extends at least partly.

Preferably the holding body 26 has a second expansion 26b inside which the sensor 21 extends at least partly. In case of pressure sensor and/or temperature sensor, the second expansion 26b has an opening (not shown in FIG. 4), for the purpose of allowing the sensor to carry out the necessary measurements.

The holding body 26 has at least one side surface 261.

The holding body 26 also has a lower surface 262 and a top surface 263.

The monitoring device 10 also comprises a connecting member 30.

The connecting member 30 maintains the electronic unit 20 constrained to the tyre 1, and in particular to the inner surface 2 of the latter.

Preferably the connecting member 30 is of single piece construction.

Preferably the connecting member 30 is made of elastomeric material. Such elastomeric material can for example comprise a thermoplastic elastomer. In a preferred embodiment, the elastomeric material comprises a halogenated butyl rubber and a synthetic rubber (e.g. polybutadiene, or polyisoprene).

Examples of elastomeric materials which can be employed are described in the international patent application published with number WO 2010/043264 on behalf of the same Applicant.

The connecting member 30 (FIGS. 2-3, 3a-3c, 6-6a, 7, 7a-7b) comprises a first and a second base portion 31, 32. The base portions 31, 32 are separated by a separation region 33. The separation region 33 has a major extension direction X.

Each of the base portions 31, 32 has a respective base surface 31a, 32a. The base surfaces 31a, 32a are associable with the inner surface 2 of the tyre 1.

The connecting member 30 also comprises a housing portion 34 associated with the base portions 31, 32 defining, in cooperation with such base portions 31, 32, a cavity 35 for housing the electronic unit 20.

The housing portion 34 conveniently comprises a side structure 34a, configured for exerting a containing action at least relative to movements of the electronic unit 20 carried out in a major extension direction X of the separation region 33, and with respect to movements of the electronic unit 20 carried out in a direction orthogonal to the major extension direction X of said separation region 33.

In other words, the side structure 34a prevents an extraction of the electronic unit 20 from the cavity 35 at least in the major extension direction X of the separation region 33, and in the direction perpendicular thereto. Preferably, the side structure 34a prevents an extraction of the electronic unit 20 from the cavity 35 in any one direction contained in a plane substantially parallel to a plane formed by the base surfaces 31a, 32a.

Figure 2:
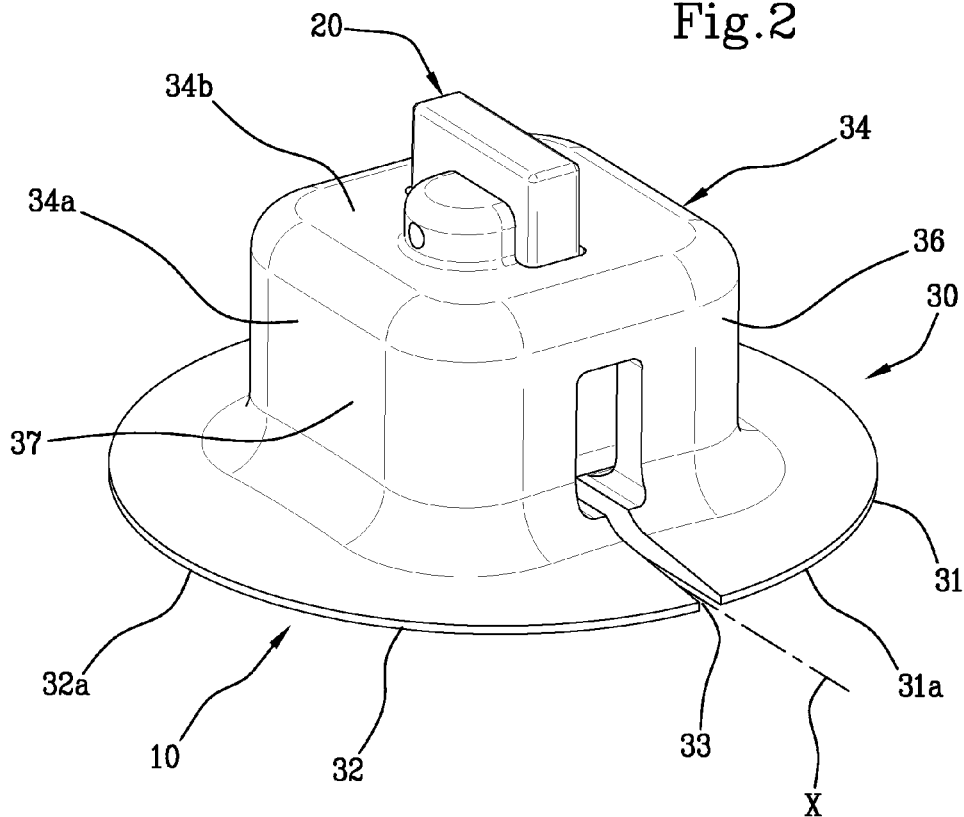
FIG. 2 schematically shows a perspective view of a monitoring device according to the invention.
Figure 2A:
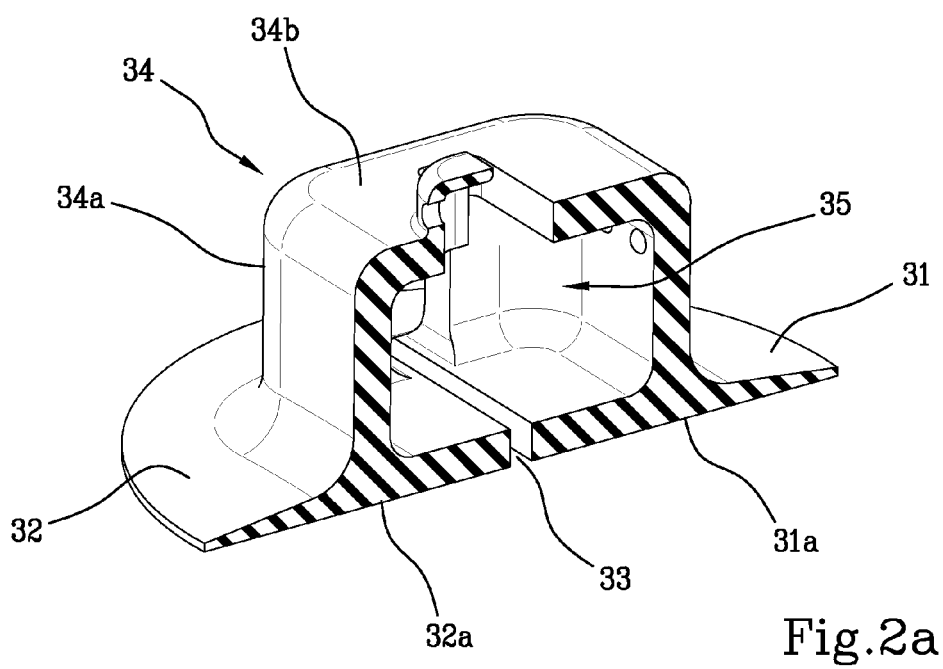
FIG. 2a schematically shows a perspective view in section of the device of FIG. 2, in which some parts have been eliminated in order to better illustrate other parts.
Figure 3:
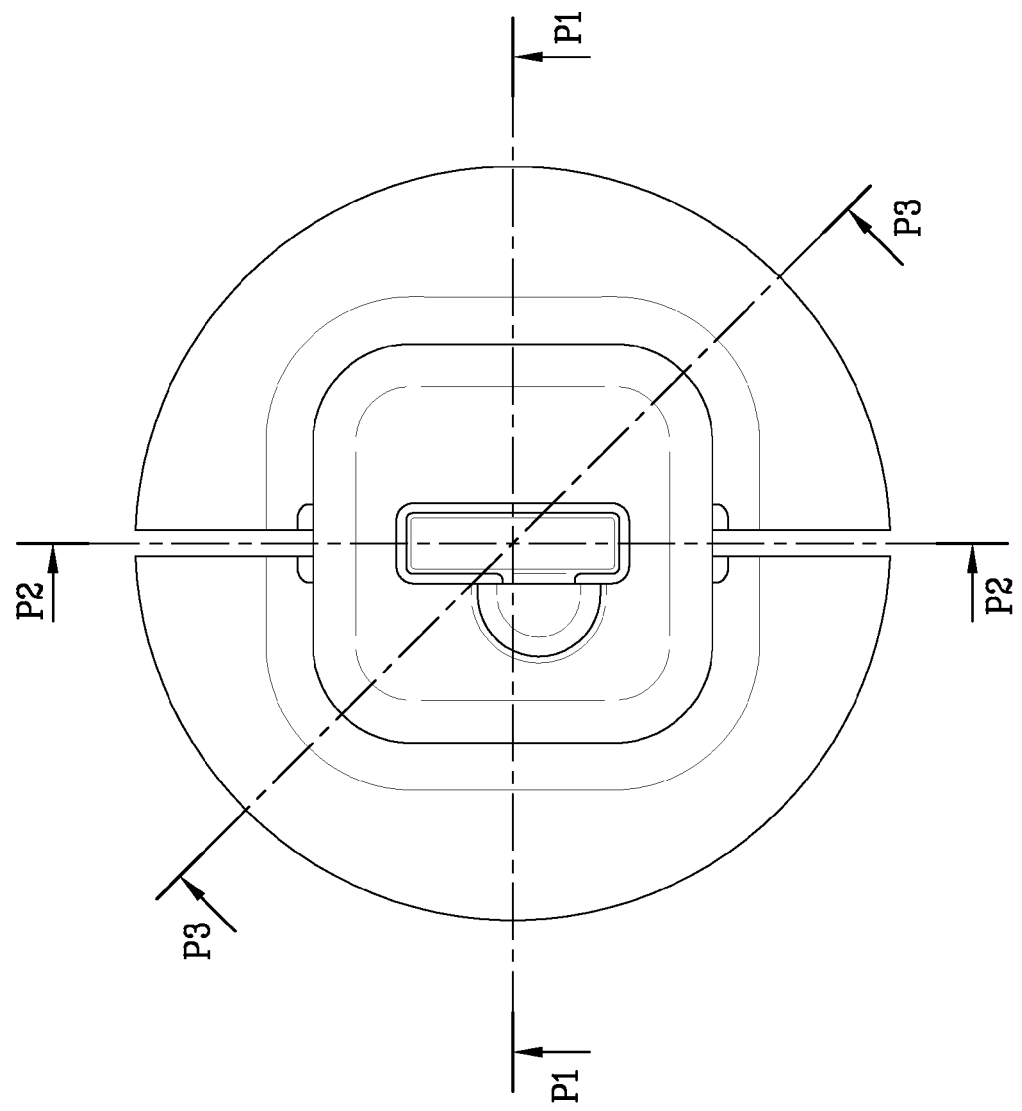
FIG. 3 schematically shows a plan view of a first embodiment of a monitoring device according to the invention.

Preferably, as schematically shown in FIGS. 2 and 3, the side containment structure 34a comprises a first and a second side wall 36, 37.

Preferably each first and second side wall 36, 37 is substantially C-shaped.

The cavity 35 is confined at least by a side surface 351 defined by an inner surface 340 of the side structure 34.

Figure 7:
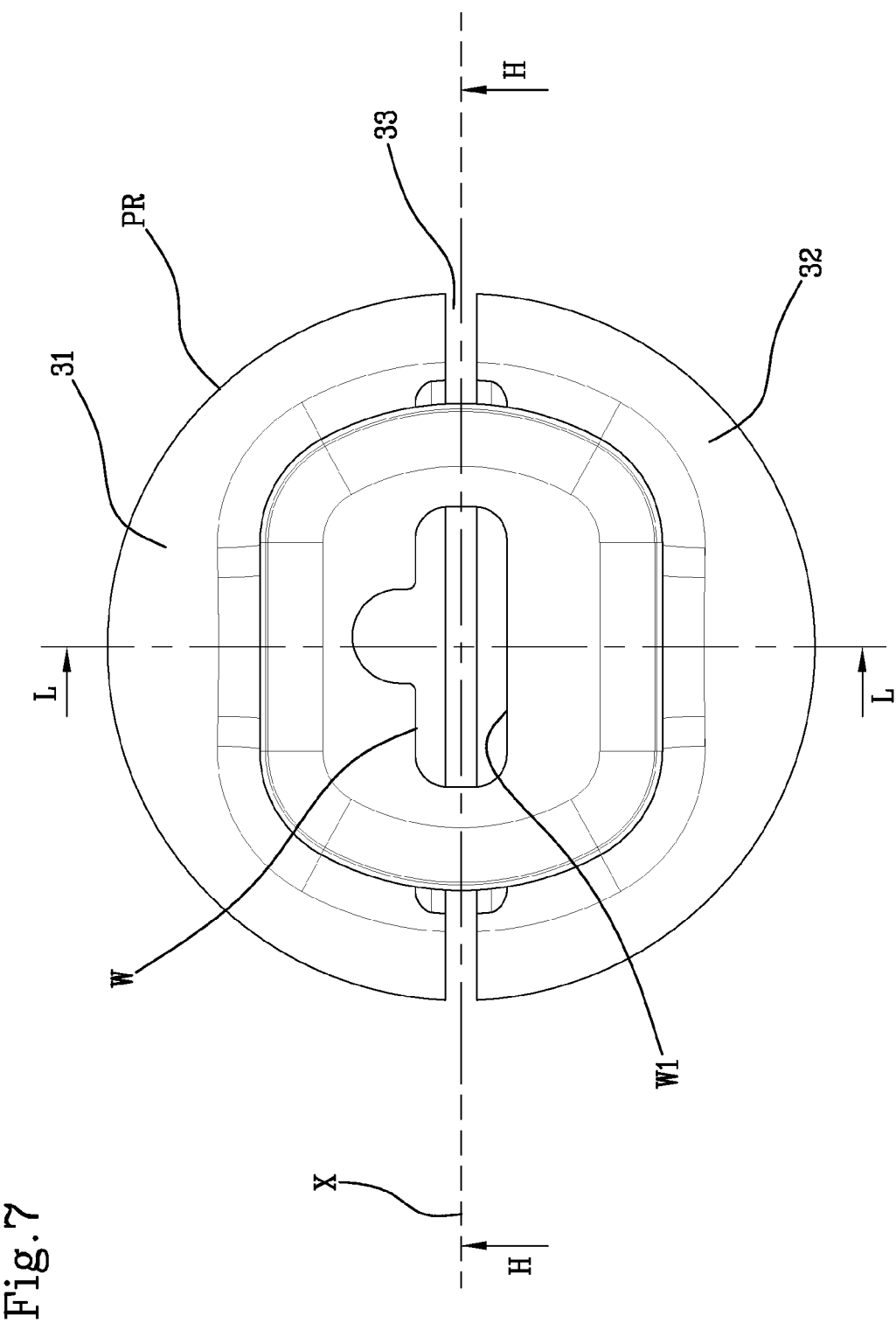
FIG. 7 shows a plan view of a connecting member part of the device of FIG. 6.
Figure 7A:
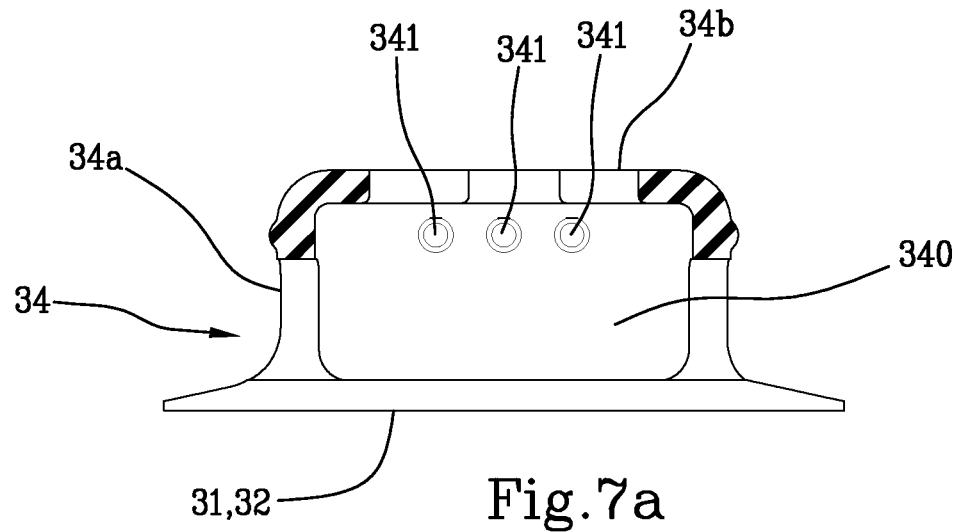
FIGS. 7a, 7b respectively show sectional views of the connecting member of FIG. 7 taken along lines H-H and L-L shown in FIG. 7.
Figure 7B:
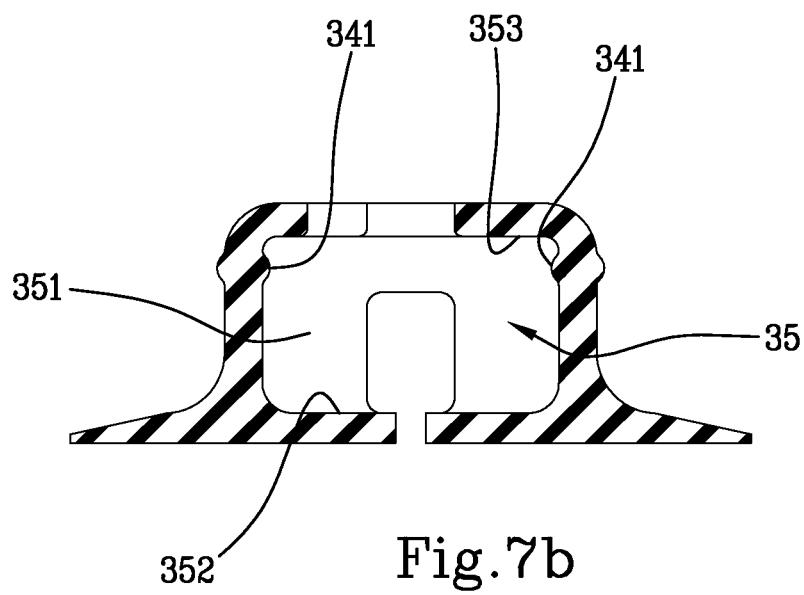

The cavity 35 is also confined on the lower part by a lower surface 352 defined by top surfaces of the base portions 31, 32 (FIG. 7b).

The cavity 35 is also confined by a top surface 353 defined by a lower surface of a top wall 34b part of the housing portion 34 and which will be better described below.

Preferably, the inner surface of the housing portion 34 confining the cavity 35 does not show cylindrical symmetry relative to any axis.

The electronic unit 20 and the connecting member 30 can be obtained separately.

When the electronic unit 20 must be installed in the tyre 1, the electronic unit 20 itself is inserted in the cavity 35 and, subsequently, the base surfaces 31a, 32a of the base portions 31, 32 are fixed to the inner surface of the tyre 1, e.g. by means of bonding. Typically, this occurs after cleaning of the inner surface of the tyre 1, e.g. by means of laser.

Preferably the monitoring device is fixed to the tyre 1 in a manner such that the major extension direction X of the separation region 33 is substantially disposed in a radial plane of the tyre 1.

When the electronic unit 20 is housed in the cavity 35: the side surface 261 of the holding body 26 faces the side surface 351 of the cavity 35; the lower surface 262 of the holding body 26 faces the lower surface 352 of the cavity 35; the top surface 263 of the holding body 26 faces the top surface 353 of the cavity 35.

Advantageously, the sizes of the cavity 35 and of the holding body 26 are such as to form at least one first gap 100 at least partly separating the side surface 261 of the holding body 26 and the side surface 351 of the cavity 35.

Preferably the electronic unit 20 can be positioned inside the cavity 35 at least at one position in which the abovementioned first gap 100 is peripherally continuous around the holding body 26 in at least one plane substantially parallel to a plane defined by the base surfaces 31a, 32a.

As an example, the first gap 100 can have a width, calculated on lines lying on a plane substantially parallel to the plane defined by said base surfaces 31a, 32a, and passing through a geometric centre of a profile PR defined by the base portions 31, 32 in the plane of the base surfaces 31a, 32a, included between about 0.1 mm and about 1 mm.

Preferably the side structure 34 comprises one or more expansions 341 extending from the side surface 351 of the cavity 35 at least to the inside of the cavity 35 itself.

The expansions 341 are adapted to maintain the electronic unit 20 in a determined position inside the cavity 35, when the electronic unit 20 is positioned inside the cavity 35 and the device 10 is maintained in conditions of substantial immobility, i.e. in absence of external mechanical stresses (e.g. stresses transmitted due to the rolling of the tyre).

In this manner, one obtains a double advantage: the mechanical interaction between the holding body 26 and the surfaces confining the cavity 35 is extremely reduced, and the movements of the electronic unit 20 inside the cavity 35 during the rolling of the tyre 1 are of extremely controlled.

Preferably, there are at least two expansions 341, positioned on mutually opposite sides relative to a plane substantially orthogonal to the plane defined by the base surfaces 31a, 32a and passing through the major extension direction X of the separation region 33.

In a preferred embodiment, illustrated in FIGS. 7a, 7b, the side structure 34 comprises a total of six expansions 341, divided into two rows of three expansions each, arranged on opposite sides with respect to the abovementioned plane perpendicular to the base surfaces 31a, 32a, and passing through the major extension direction X of the separation region.

Preferably when the electronic unit 20 is found in the specific position, the lower surface 262 of the holding body 26 is in contact with the lower surface 352 of the cavity 35.

Preferably the electronic unit 20 can be positioned inside the cavity 35 at least at one position in which the top surface 263 of the holding body 26 and the top surface 353 of the cavity 35 are separated by a second gap 200.

Preferably, the second gap 200 is such that, when the lower surface 262 of the holding body 26 is in contact with the lower surface 352 of the cavity 35, the top surface 263 of the holding body 26 is fully separated from the top surface 353 of said cavity 35.

Preferably, the second gap 200 can have a width, calculated on a line orthogonal to the plane of the base surfaces 31a, 32a and belonging to the plane perpendicular to the major extension direction X of the separation region 33, included between about 0.1 mm and about 1 mm.

As mentioned above, the housing portion 34 comprises a top wall 34a.

The side structure 34b is interposed between the top wall 34a and the base portions 31, 32.

Preferably the top wall 34b has at least one through window W through which the first expansion 26a and/or the second expansion 26b of the holding body 26 extend at least partly.

In this manner, the antenna 22 and/or the sensor 21 can operate correctly without the structure of the connecting member 30, and in particular the top wall 34b interfering from an electromagnetic and/or mechanical standpoint.

Preferably, the electronic unit 20 can be positioned inside the cavity 35 in at least one position in which the first expansion 26a and/or the second expansion 26b are fully separated from a perimetral profile W1 of the through window W.

In this manner one considerably reduces the probability that, even with regard to substantially incontrollable movements of the electronic unit 20 inside the cavity 35 during the rolling of the tyre 1, the interaction between the first and/or second expansion 26a, 26b and the perimetral profile W1 of the through window W is of an intensity such to cause tearing and/or breakage of the top wall 34b. When the electronic unit 20 is arranged inside the cavity 35, a third gap 300 is defined between the first and/or second expansion 26a, 26b of the holding body 26 and the perimetral profile W1 of the through window W.

As an example, the third gap 300 can have, on a line belonging to the plane passing through the major extension direction X of the separation region 33 and orthogonal to the plane of the base surfaces 31a, 32a, a width included between about 0.1 mm and about 1 mm.

Preferably, the holding body 26, ignoring the abovementioned expansions 26a, 26b, has a substantially box-like conformation, e.g. substantially parallelepiped. Preferably, edges and vertices of the holding body 26 are suitably rounded in a manner so as to minimize damage to the structure of the connecting member 30 when the electronic unit 20 comes into contact with the side structure 34a, the top wall 34b and/or with the base portions 31, 32.

Preferably the cavity 35 is approximately counter-shaped with respect to the holding body 26, so as to suitably house the electronic unit 20, maintaining low overall dimensions.

Preferably, however, there are significant differences between the outer profiles of the holding body and the profiles defined by the surfaces confining the cavity 35. This, once again, for the purpose of minimising the consequences of the mechanical interactions that are developed inside the cavity 35, between the electronic unit 20 and the connecting member 20, during the rolling of the tyre 1. Preferably, in a section taken along a first plane P1 orthogonal to the major extension direction X of the separation region 33, a connection region R1 is defined between the side surface 351 and the lower surface 352 confining the cavity 35.

Such connection region R1 has a curvilinear profile different from a curvilinear profile defined, in the same section, at a connection region R1' between the side surface 261 and the lower surface 262 of the holding body 26. In other words the two profiles of the connection regions R1 and R1' (schematically shown in FIG. 3a) are not joined together.

Hence, should the connection regions R1 and R1' come into mutual contact, there would not be complete adherence between the two surfaces and the structure of the connecting member 30 would resist with greater effectiveness against the action exerted by the electronic unit 20.

Preferably, in a section taken along a first plane P1 orthogonal to the major extension direction X of the separation region 33, a connection region R2 is defined between the side surface 351 and the top surface 353 confining the cavity 35.

Such connection region R2 has a curvilinear profile different from a curvilinear profile defined, in the same section, at a connection region R2' between the side surface 261 and a top surface 263 of the holding body 26. In other words the two profiles of the connection regions R2 and R2' (schematically shown in FIG. 3a) are not joined together.

Hence, should the connection regions R2 and R2' come into mutual contact, there would not be complete adherence between the two surfaces and the structure of the connecting member 30 would resist with greater effectiveness against the action exerted by the electronic unit 20.

Preferably, in a section taken along a second plane P2 orthogonal to the plane defined by the base surfaces 31a, 32a and parallel to the major extension direction X of the separation region 33, a connection region R3 is defined between the side surface 351 and the lower surface 352 confining the cavity 35. Preferably such connection region R3 has a curvilinear profile different from a curvilinear profile defined, in the same section, at a connection region R3' between the side surface 261 and the lower surface 262 of the holding body 26. In other words, the two profiles of the connection regions R3 and R3' (schematically shown in FIG. 3c) are not joined together.

Hence, should the connection regions R3 and R3' come into mutual contact, there would not be complete adherence between the two surfaces and the structure of the connecting member 30 would resist with greater effectiveness against the action exerted by the electronic unit 20.

Preferably, in a section taken along a second plane P2 orthogonal to the plane defined by the base surfaces 31a, 32a and parallel to the major extension direction X of the separation region 33, a connection region R4 is defined between the side surface 351 and the top surface 353 confining the cavity 35. Such connection region R4 has a curvilinear profile different from a curvilinear profile defined, in the same section, at a connection region R4' between the side surface 261 and the top surface 263 of the holding body 26. In other words the two profiles of the connection regions R4 and R4' (schematically shown in FIG. 3c) are not joined together.

Hence, should the connection regions R4 and R4' come into mutual contact, there would not be complete adherence between the two surfaces and the structure of the connecting member 30 would resist with greater effectiveness against the action exerted by the electronic unit 20.

Preferably, in a section taken along a third plane P3 passing through an axis orthogonal to the plane defined by the base surfaces 31a, 32a and passing through the centre of a profile PR defined by the base portions 31, 32 in the plane identified by the base surfaces 31a, 32a, a connection region R5 is defined between the side surface 351 and the lower surface 352 confining the cavity 35.

Such connection region R5 has a curvilinear profile different from a curvilinear profile defined at a connection region R5' between the side surface 261 and the lower surface 262 of the holding body 26. In other words the two profiles of the connection regions R5 and R5' (schematically shown in FIG. 3b) are not joined together.

Hence, should the connection regions R5 and R5' come into mutual contact, there would not be complete adherence between the two surfaces and the structure of the connecting member 30 would resist with greater effectiveness against the action exerted by the electronic unit 20.

Preferably, in a section taken along a third plane P3 passing through an axis orthogonal to the plane defined by the base surfaces 31a, 32a and passing through the centre of a profile PR defined by the base portions 31, 32 in the plane identified by said base surfaces 31a, 32a, a connection region R6 is defined between the side surface 351 and the top surface 353 of the cavity 35. Such connection region R6 has a curvilinear profile different from a curvilinear profile defined at a connection region R6' between the side surface 261 and the top surface 263 of the holding body 26. In other words the two profiles of the connection regions R6 and R6' (schematically shown in FIG. 3a) are not joined together.

Hence, should the connection regions R6 and R6' come into mutual contact, there would not be complete adherence between the two surfaces and the structure of the connecting member 30 would resist with greater effectiveness against the action exerted by the electronic unit 20.

Preferably, in a section taken along a fourth plane P4 substantially parallel to the plane defined by the base surfaces 31a, 32a, the holding body 26 has a perimetral profile comprising two substantially rectilinear opposite segments 26T1, 26T2 connected by a pair of curvilinear connections 26R1, 26R2.

Preferably such curvilinear connections 26R1, 26R2 have a profile different from the curvilinear profile shown by the perimetral profile portion PRP1, PRP2 of the housing portion 34 facing such curvilinear connections 26R1, 26R2 (FIG. 6a). In other words the curvilinear connections 26R1, 26R2 and the perimetral profile portions PRP1, PRP2 are not joined together.

Hence, should the curvilinear connections 26R1 and 26R2 come into contact with the perimetral profile portions PRP1 and PRP2, there would not be complete adherence between the two surfaces and the structure of the connecting member 30 would resist with greater effectiveness against the action exerted by the electronic unit 20.

The invention claimed is:

1. A monitoring device for a tyre for vehicle wheels, comprising:
   an electronic unit;
   a connecting member configured for constraining said electronic unit to a tyre, said connecting member comprising:
      a first and a second base portion mutually separated by a separation region, each of said base portions having a respective base surface associable with an inner surface of a tyre; and
      a housing portion associated with said base portions defining, in cooperation with said base portions, a cavity for housing said electronic unit,
   wherein said housing portion comprises at least one side structure, configured for exerting a containing action at least relative to movements of said electronic unit carried out in a major extension direction of said separation region and with respect to movements of said electronic unit carried out in a direction orthogonal to the major extension direction of said separation region,
   wherein said cavity is confined at least by a side surface defined by an inner surface of said side structure,
   wherein said electronic unit comprises at least one sensor, at least one antenna and a holding body for housing at least said sensor and antenna,
   wherein said holding body has at least one side surface, and
   wherein, when said electronic unit is inserted in said cavity,
      the side surface of the holding body faces the side surface of the cavity, and the sizes of said cavity and of said holding body are such as to form at least one first gap at least partly separating the side surface of the holding body and the side surface of the cavity.

2. The device as claimed in claim 1, wherein said cavity is confined on a lower part thereof by a lower surface defined by top surfaces of said base portions.

3. The device as claimed in claim 1, wherein said cavity is confined on an upper part thereof by a top surface defined by a lower surface of a top wall of said housing portion.

4. The device as claimed in claim 1, wherein said electronic unit can be positioned inside said cavity at least at one position in which said first gap is peripherally continuous around said holding body in at least one plane substantially parallel to a plane defined by said base surfaces.

5. The device as claimed in claim 1, wherein said first gap has a width between about 0.1 mm and about 1 mm.

6. The device as claimed in claim 1, wherein said side structure further comprises one or more expansions extending from the side surface of said cavity to inside of said cavity.

7. The device as claimed in claim 6, wherein said side structure comprises at least two of said expansions positioned on mutually opposite sides relative to a plane substantially orthogonal to a plane defined by said base surfaces and passing through a major extension direction of said separation region.

8. The device as claimed in claim 1, wherein said cavity is confined on an upper part thereof by a top surface defined by a lower surface of a top wall of said housing portion, wherein said holding body comprises a respective top surface, and wherein said electronic unit can be positioned inside said cavity at least at one position in which the top surface of said holding body and the top surface of said cavity are separated by a second gap.

9. The device as claimed in claim 8, wherein said second gap is such that, when a lower surface of said holding body is in contact with a lower surface of said cavity, the top surface of said holding body is fully separated from the top surface of said cavity.

10. The device as claimed in claim 8, wherein said second gap has a width between about 0.1 mm and about 1 mm.

11. The device as claimed in claim 1, wherein said holding body has at least one first expansion inside which said antenna extends at least partly and/or a second expansion inside which said sensor extends at least partly.

12. The device as claimed in claim 1, wherein said cavity is confined on an upper part thereof by a top surface defined by a lower surface of a top wall of said housing portion, and wherein the top wall of said housing portion is associated with said base portions in such a manner that said side structure is interposed between said base portions and said top wall.

13. The device as claimed in claim 12, wherein said top wall has at least one through window through which said first expansion and/or said second expansion extend at least partly.

14. The device as claimed in claim 13, wherein said electronic unit can be positioned inside said cavity in at least one position in which said first expansion and/or said second expansion are fully separated from a perimetral profile of said through window.

15. The device as claimed in claim 14, wherein said connecting member has a third gap separating said first expansion and/or said second expansion from the perimetral profile of said through window when said electronic unit is positioned in said cavity, wherein said third gap has a width between about 0.1 mm and about 1 mm.

16. The device as claimed claim 2, wherein, in a section taken along a first plane orthogonal to the major extension direction of said separation region, a connection region between the side surface and the lower surface confining said cavity has a curvilinear profile different from a curvilinear profile defined at a connection region between the side surface and a lower surface of said holding body.

17. The device as claimed in claim 3, wherein, in a section taken along a first plane orthogonal to the major extension direction of said separation region, a connection region between the side surface and the top surface confining said cavity has a curvilinear profile different from a curvilinear profile defined at a connection region between the side surface and a top surface of said holding body.

18. The device as claimed in claim 2, wherein, in a section taken along a second plane orthogonal to a plane defined by said base surfaces and parallel to the major extension direction of said separation region, a connection region between the side surface and the lower surface confining said cavity has a curvilinear profile different from a curvilinear profile defined at a connection region between the side surface and a lower surface of said holding body.

19. The device as claimed in claim 3, wherein, in a section taken along a second plane orthogonal to a plane defined by said base surfaces and parallel to the major extension direction of said separation region, a connection region between the side surface and the top surface confining said cavity has a curvilinear profile different from a curvilinear profile defined at a connection region between the side surface and a top surface of said holding body.

20. The device as claimed in claim 2, wherein, in a section taken along a third plane passing through an axis orthogonal to a plane defined by said base surfaces and passing through a centre of a profile defined by said base portions in the plane identified by said base surfaces, a connection region between the side surface and the lower surface confining said cavity has a curvilinear profile different from a curvilinear profile defined at a connection region between the side surface and a lower surface of said holding body.

21. The device as claimed in claim 3, wherein, in a section taken along a third plane passing through an axis orthogonal to a plane defined by said base surfaces and passing through a centre of a profile defined by said base portions in the plane identified by said base surfaces, a connection region between the side surface and the top surface of said cavity has a curvilinear profile different from a curvilinear profile defined at a connection region between the side surface and a top surface of said holding body.

22. The device as claimed in claim 1, wherein, in a section taken along a fourth plane substantially parallel to a plane defined by said base surfaces, said holding body has a perimetral profile comprising two substantially rectilinear opposite segments connected by a pair of curvilinear connections having a profile different from a curvilinear profile shown by a perimetral profile portion of said housing portion facing said curvilinear connections.

23. The device as claimed in claim 1, wherein said holding body does not show cylindrical symmetry relative to any axis.

24. The device as claimed in claim 1, wherein said inner surface of said side structure confining said cavity does not show cylindrical symmetry relative to any axis.

25. A tyre for vehicle wheels comprising:
   an inner surface having substantially toroidal conformation; and
   a monitoring device as claimed in claim 1, mounted on said inner surface.

26. The tyre as claimed in claim 25, wherein the major extension direction of said separation region is disposed substantially in a radial plane of said tyre.

27. The tyre as claimed in claim 25, wherein said inner surface is a liner of said tyre.

28. A method for installing an electronic unit in a tyre for vehicle wheels, comprising:

providing an electronic unit and a connecting member adapted to form a monitoring device as claimed in claim 1; and fastening the base surfaces of the base portions of said connecting member to an inner surface of a tyre.

* * * * *